(12) United States Patent
Leismer et al.

(10) Patent No.: US 10,934,789 B2
(45) Date of Patent: Mar. 2, 2021

(54) SYSTEM AND METHOD FOR TERMINATING CABLE

(71) Applicant: ACCESSESP UK LIMITED, Great Yarmouth (GB)

(72) Inventors: Dwayne Leismer, Houston, TX (US); Matthew Benham, Houston, TX (US); Jansen Lloyd, Houston, TX (US)

(73) Assignee: ACCESSESP UK LIMITED, Great Yarmouth (GB)

( * ) Notice: Subject to any disclaimer, the term of this patent is extended or adjusted under 35 U.S.C. 154(b) by 260 days.

(21) Appl. No.: 16/138,543

(22) Filed: Sep. 21, 2018

(65) Prior Publication Data

US 2019/0186210 A1   Jun. 20, 2019

Related U.S. Application Data

(60) Provisional application No. 62/561,654, filed on Sep. 21, 2017.

(51) Int. Cl.
*H01B 7/00* (2006.01)
*H02G 9/06* (2006.01)
(Continued)

(52) U.S. Cl.
CPC .......... *E21B 17/206* (2013.01); *E21B 17/028* (2013.01); *E21B 41/00* (2013.01);
(Continued)

(58) Field of Classification Search
CPC ........ H02G 15/00; H02G 15/007; H02G 9/00; H02G 9/06; H02G 1/1204; H02G 1/1202;
(Continued)

(56) References Cited

U.S. PATENT DOCUMENTS 3,614,905 A * 10/1971 Bieganski ............ H02G 1/1265
  81/9.51
3,895,426 A *  7/1975 Papsdorf .............. H02G 1/1256
  29/867

(Continued)

FOREIGN PATENT DOCUMENTS

| EP | 2675026 A2 | 12/2013 |
| GB | 2122815 A | 1/1984 |
| WO | 2016167770 A1 | 10/2016 |

OTHER PUBLICATIONS

European Patent Office—Extended European Search Report in counterpart EPO application 18196120.2 dated Feb. 11, 2019 including transmittal letter dated Feb. 19, 2019, 6 pages.

*Primary Examiner* — Angel R Estrada
(74) *Attorney, Agent, or Firm* — Gordon G. Waggett, P.C.

(57) ABSTRACT

A system and a method for removing a portion of an electric submersible pump power cable conduit housing are provided. The method may include cutting a conduit housing of the conduit, sliding the cut conduit housing off the conduit, and squaring an end surface of remaining conduit housing. The cutting of the conduit housing is not a through cut and the sliding of the cut conduit housing off of the cut conduit is performed with a conduit housing spreader. The system may include a conduit housing cutter for cutting partially through the conduit housing of the conduit and a conduit housing spreader for pulling the portion of the conduit housing apart from a remaining conduit housing. In addition, the system may include a squaring tool to square an end surface of the remaining conduit housing relative to an axis of the conduit.

20 Claims, 13 Drawing Sheets

(51) Int. Cl.
*E21B 17/20* (2006.01)
*E21B 17/02* (2006.01)
*E21B 43/12* (2006.01)
*E21B 41/00* (2006.01)
*F04D 13/10* (2006.01)
*H02G 1/12* (2006.01)
*F04D 13/06* (2006.01)

(52) U.S. Cl.
CPC ........ *E21B 43/126* (2013.01); *F04D 13/0693* (2013.01); *F04D 13/10* (2013.01); *H02G 1/1224* (2013.01); *H02G 9/06* (2013.01)

(58) Field of Classification Search
CPC ........ H02G 1/1212; H02G 1/00; H02G 1/005; H02G 1/12; H02G 1/1224; F04D 13/0693; F04D 13/10; E21B 17/206; E21B 17/028; E21B 41/00; E21B 43/126
USPC ........ 174/68.1, 135, 74 R, 88 R, 99 R, 99 S; 30/165, 90.1, 90.4, 91.1, 90.8; 7/107, 7/134, 133
See application file for complete search history.

(56) References Cited

U.S. PATENT DOCUMENTS

| | | | | |
|---|---|---|---|---|
| 4,063,343 | A | * 12/1977 | Reymond | G02B 6/245 |
| | | | | 29/867 |
| 4,083,105 | A | * 4/1978 | ViPond | H02G 1/1229 |
| | | | | 30/90.4 |
| 4,429,451 | A | * 2/1984 | Angelico | H01R 43/015 |
| | | | | 29/33 M |
| 4,459,881 | A | 7/1984 | Hughes, Jr. | |
| 4,509,257 | A | * 4/1985 | Moriyama | H02G 1/1204 |
| | | | | 29/825 |
| 4,713,874 | A | 12/1987 | Schwartz | |
| 5,046,252 | A | * 9/1991 | Ayuta | B26D 3/169 |
| | | | | 29/566.4 |
| 10,574,040 | B2 | * 2/2020 | Troy | H02G 1/005 |
| 10,601,206 | B2 | * 3/2020 | Murg | H02G 1/1214 |

* cited by examiner

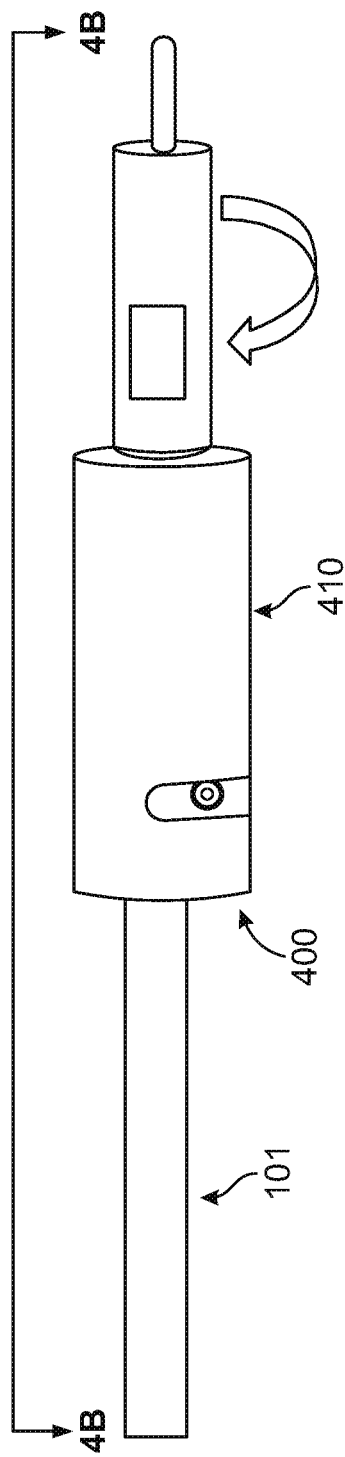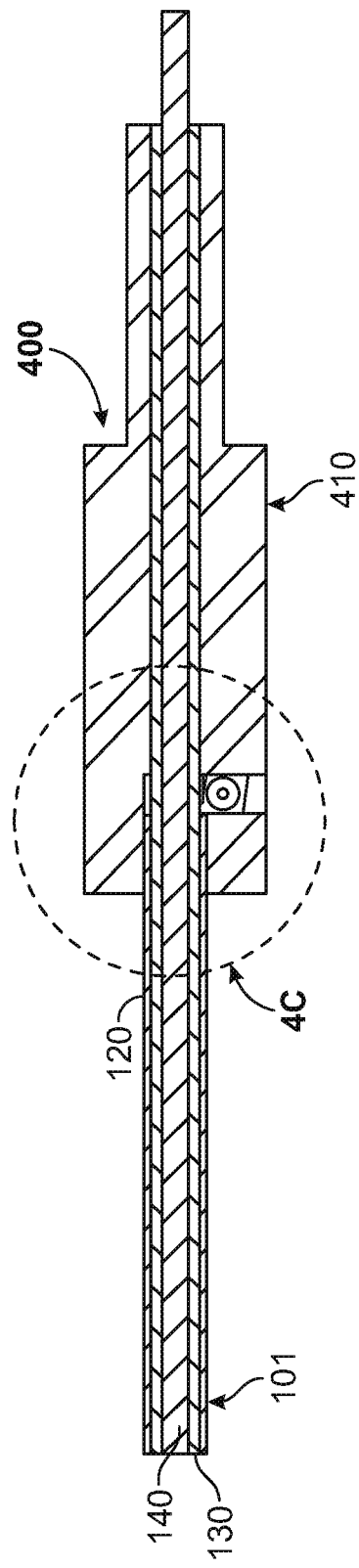
FIG. 4A
FIG. 4B

SYSTEM AND METHOD FOR TERMINATING CABLE

CROSS-REFERENCE TO RELATED APPLICATIONS

This application claims the benefit of the filing date of and priority to: U.S. Provisional Application Ser. No. 62/561,654 entitled "System and Method for Terminating Cable" and filed Sep. 21, 2017, Confirmation No. 5247; said provisional application is incorporated by reference herein in its entirety for all purposes.

STATEMENT REGARDING FEDERALLY SPONSORED RESEARCH OR DEVELOPMENT

Not Applicable.

BACKGROUND OF THE INVENTION

The following descriptions and examples are not admitted to be prior art by virtue of their inclusion in this section.

Hydrocarbon fluids such as oil and natural gas are obtained from a subterranean geologic formation, referred to as a reservoir, by drilling a well that penetrates the hydrocarbon-bearing formation. In some cases, a lack of formation pressure or the viscosity of the hydrocarbon produced from the formation (among other reasons) require the use of artificial lift systems to extract the hydrocarbon fluid from the well. One type of artificial lift system involves the use of electric submersible pumps (ESPs) to provide a motivating force for the extraction of fluid from the well.

An extended cable may be provided to power an ESP located at a distance downhole. This cable would have to survive the incredibly harsh environment of the wellbore. To facilitate survival, various layers of insulation and coatings may surround the individual conduits providing the electricity. However, terminations of cables, such as terminating a power cable into another component such as a connector housing, present challenges in properly cutting and preparing the cable for establishing a reliable connection to another component. Improper or incorrect termination may generate unintended leak paths and corrosion due to contamination by wellbore fluid as well as creating potential concentrations of electrical stresses due to non-uniform cable cutting.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Embodiments of the claimed disclosure may comprise a method for preparing a conduit for termination. The method may further include cutting a conduit housing of the conduit, sliding the cut conduit housing off the conduit, and squaring an end surface of remaining conduit housing. The cutting of the conduit housing is not a through cut and the sliding of the cut conduit housing off of the cut conduit is performed with a conduit housing spreader.

Another embodiment of the claimed disclosure may comprise a system for removing a portion of conduit housing from a conduit. The system may further include a conduit housing cutter for cutting partially through the conduit housing of the conduit and a conduit housing spreader for pulling the portion of the conduit housing apart from a remaining conduit housing. In addition, the system may include a squaring tool to square an end surface of the remaining conduit housing relative to an axis of the conduit.

Still other embodiments of the claimed disclosure may comprise a method for removing a portion of a conduit housing from a conduit. The method may include cutting the conduit housing only a portion of a way through the conduit housing, separating the portion of the conduit housing from a remaining portion of the conduit housing by applying a tensile load to an uncut portion of the cut, and squaring an end surface of the remaining portion of the conduit housing relative to an axis of the conduit.

One embodiment is directed to a method for preparing an electric submersible pump power cable conduit for termination comprising cutting a conduit housing of the conduit; sliding the cut conduit housing off the conduit; and squaring an end surface of remaining conduit housing, wherein the above steps are performed with hand powered tools. The cutting of the conduit housing may further comprise rotating cutters on a hand powered conduit cutting tool about an outer surface of the conduit until the conduit housing is cut to a desired depth. The hand powered tool for cutting the conduit housing may further comprise: a handle rotatably coupled to the cutters; and a keyed collet nut configured to move the cutters radially with regards to an axis of the conduit when the handle is rotated, and may also further comprise a plug attached to the conduit housing cutter tool and configured to properly locate the cut made by the cutters when the conduit is inserted into the conduit housing cutter and abuts the plug. The hand powered cutting tool may further comprise a hollow shaft rotatably coupled to a handle and the cutters and comprising: a threaded portion configured to axially translate a keyed collet nut when the handle is rotated; and wherein axial translation of the keyed collet nut results in radial movement of the cutters on cutter supports.

The sliding of the cut conduit housing off of the conduit step may further comprise: clamping the conduit housing on either side of the cut using clamps; rotating a driving nut to spread the clamps apart from one another, and unclamping the clamps and removing the conduit. The spreading of the conduit housing may be accomplished using a conduit housing spreader tool. The squaring the end surface of the cut conduit housing step may further comprise: inserting the cut conduit into a hand powered squaring tool; adjusting a cutting blade (such as, e.g., a carbide blade) against an end surface of the cut conduit; rotating the cutting blade about the cut conduit; and repeating the previous two steps as needed until the end surface of the cut conduit is square relative to an axis of the cut conduit.

The squaring of the remaining conduit housing step may be accomplished by rotating a hand powered squaring tool.

There is also described a system for removing a portion of conduit housing from an electric submersible pump power cable conduit comprising a hand powered conduit housing cutter for cutting partially through the conduit housing of the conduit; a hand powered conduit housing spreader for pulling the portion of the conduit housing apart from a remaining conduit housing; and a hand powered squaring tool to square an end surface of the remaining conduit housing relative to an axis of the conduit. In one embodiment, the conduit housing cutter further comprises two cutters (such as carbide blades) that cut the conduit housing and are radially moved and rotated during rotation of a handle. The conduit housing spreader may further comprise two clamps for clamping to both sides of the cut conduit housing. In one embodiment, the conduit housing spreader further comprises a driving nut that pulls the portion of the conduit housing from the remaining conduit housing when rotated.

There is further described a method for removing a portion of an electric submersible pump power cable conduit housing from a conduit with hand powered tools, comprising: cutting the conduit housing only a portion of a way through the conduit housing, separating the portion of the conduit housing from a remaining portion of the conduit housing by applying a tensile load to an uncut portion of the cut; and squaring an end surface of the remaining portion of the conduit housing relative to an axis of the conduit. The separating of the portion of the conduit housing from a remaining portion of the conduit housing step may further comprise: clamping the portion of the conduit housing with a first clamp and clamping the remaining portion of the conduit housing with a second clamp; and applying a translating force to move the first clamp and the second clamp apart from one another. The cutting of the conduit housing step may further comprise circumferentially cutting an outer surface of the conduit housing. In one embodiment, carbon blades may be used as cutters. The cutting of the conduit housing step may further comprise using two or more cutters configured to rotate about the conduit housing and incrementally move radially inward as they rotate.

Other or alternative features will become apparent from the following description, from the drawings, and from the claims.

BRIEF DESCRIPTION OF THE SEVERAL VIEWS OF THE DRAWINGS

Certain embodiments will hereafter be described with reference to the accompanying drawings, wherein like reference numerals denote like elements. It should be understood, however, that the accompanying drawings illustrate only the various implementations described herein and are not meant to limit the scope of various technologies described herein. The drawings are as follows:

FIG. 4A is a perspective view of a squaring tool, according to an embodiment of the disclosure;

FIG. 4B is a cross-sectional view of the squaring tool of FIG. 4A taken along lines 4B-4B, according to an embodiment of the disclosure;

DETAILED DESCRIPTION

Reference throughout the specification to "one embodiment," "an embodiment," "some embodiments," "one aspect," "an aspect," or "some aspects" means that a particular feature, structure, method, or characteristic described in connection with the embodiment or aspect is included in at least one embodiment of the present disclosure. Thus, the appearance of the phrases "in one embodiment" or "in an embodiment" or "in some embodiments" in various places throughout the specification are not necessarily all referring to the same embodiment. Furthermore, the particular features, structures, methods, or characteristics may be combined in any suitable manner in one or more embodiments. The words "including" and "having" shall have the same meaning as the word "comprising."

Moreover, inventive aspects lie in less than all features of a single disclosed embodiment. Thus, the claims following the Detailed Description are hereby expressly incorporated into this Detailed Description, with each claim standing on its own as a separate embodiment.

In some embodiments, an artificial lift system for the production of downhole hydrocarbon fluids includes the use of an Electric Submersible Pump (ESP). ESP's can be powered in many ways, but one way is through the use of a power cable. The power cable itself must be able to withstand the corrosive and toxic environment of the downhole environment.

For uninterrupted sections of cables, various layers of insulation and armor of a housing can adequately provide this protection. However, to power another component a cable must be terminated and electrically coupled to the component. Accordingly, the termination of a cable may provide a weak spot or opening for wellbore fluid to leak into, potentially corroding or contaminating the power cable.

Preparations for terminating a cable to another component involves cutting through the layers of protection to allow the clear conduction of power into the component. If the cable is incorrectly cut due to an improper technique or tool, the armor coatings may be deformed or torn, resulting in electrical stress concentration points.

Figure 1:
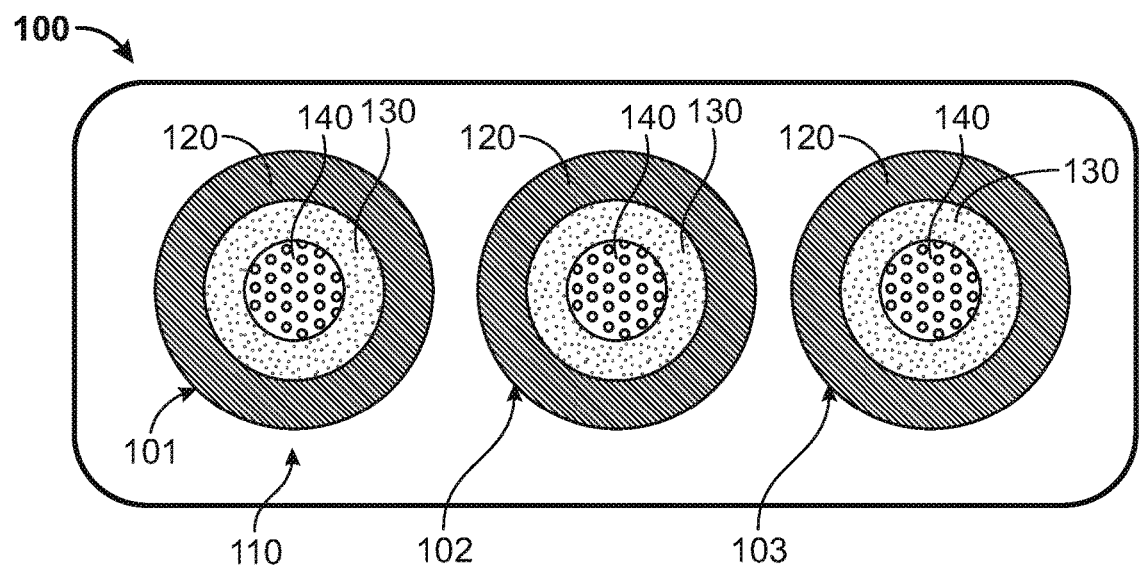
FIG. 1 is a cross-sectional view of a Tubing Encapsulated Power Cable (TEPC) cable showing three conduits according to an embodiment of the disclosure.
Figure 2A:
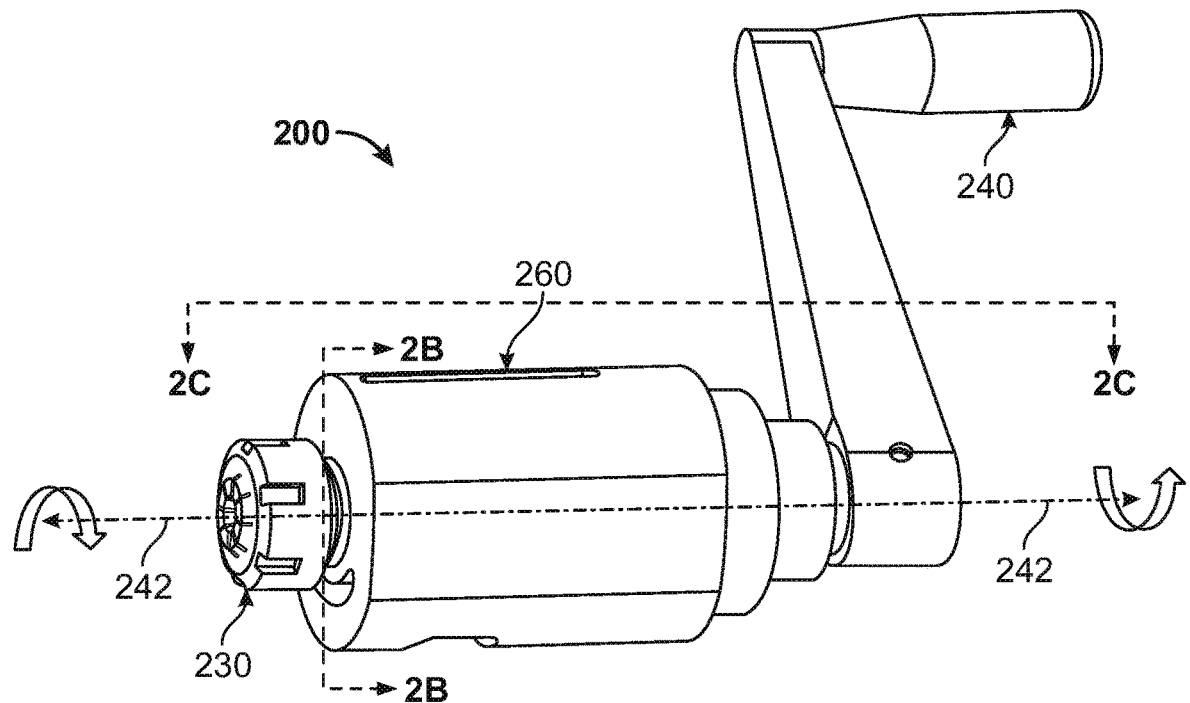
FIG. 2A is a perspective outer view of a conduit housing cutter, according to an embodiment of the disclosure.
Figure 2B:
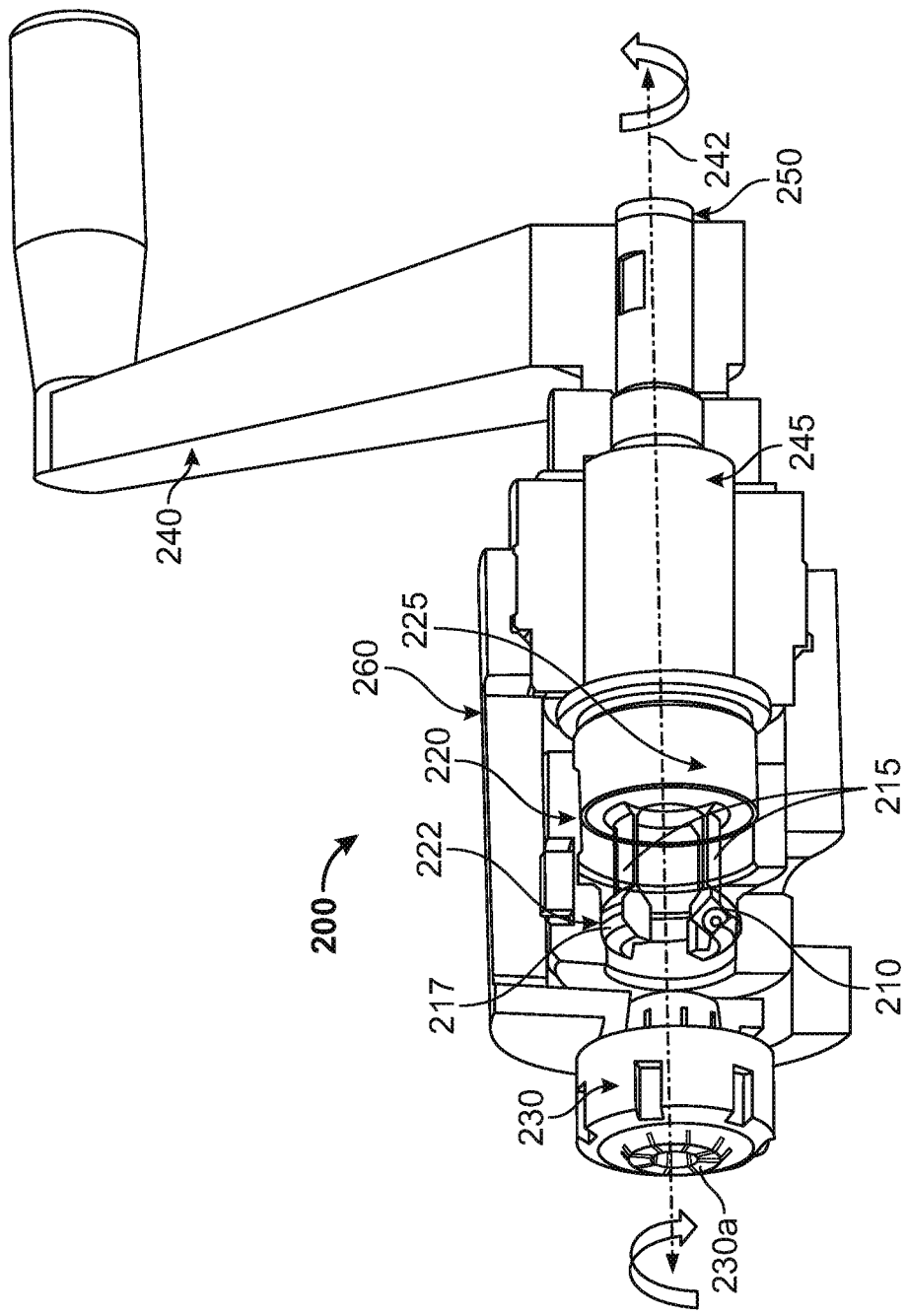
FIG. 2B is a perspective partial cross-sectional view of the conduit housing cutter of FIG. 2A taken generally along lines 2B-2B of FIG. 2A, according to an embodiment of the disclosure.
Figure 2C:
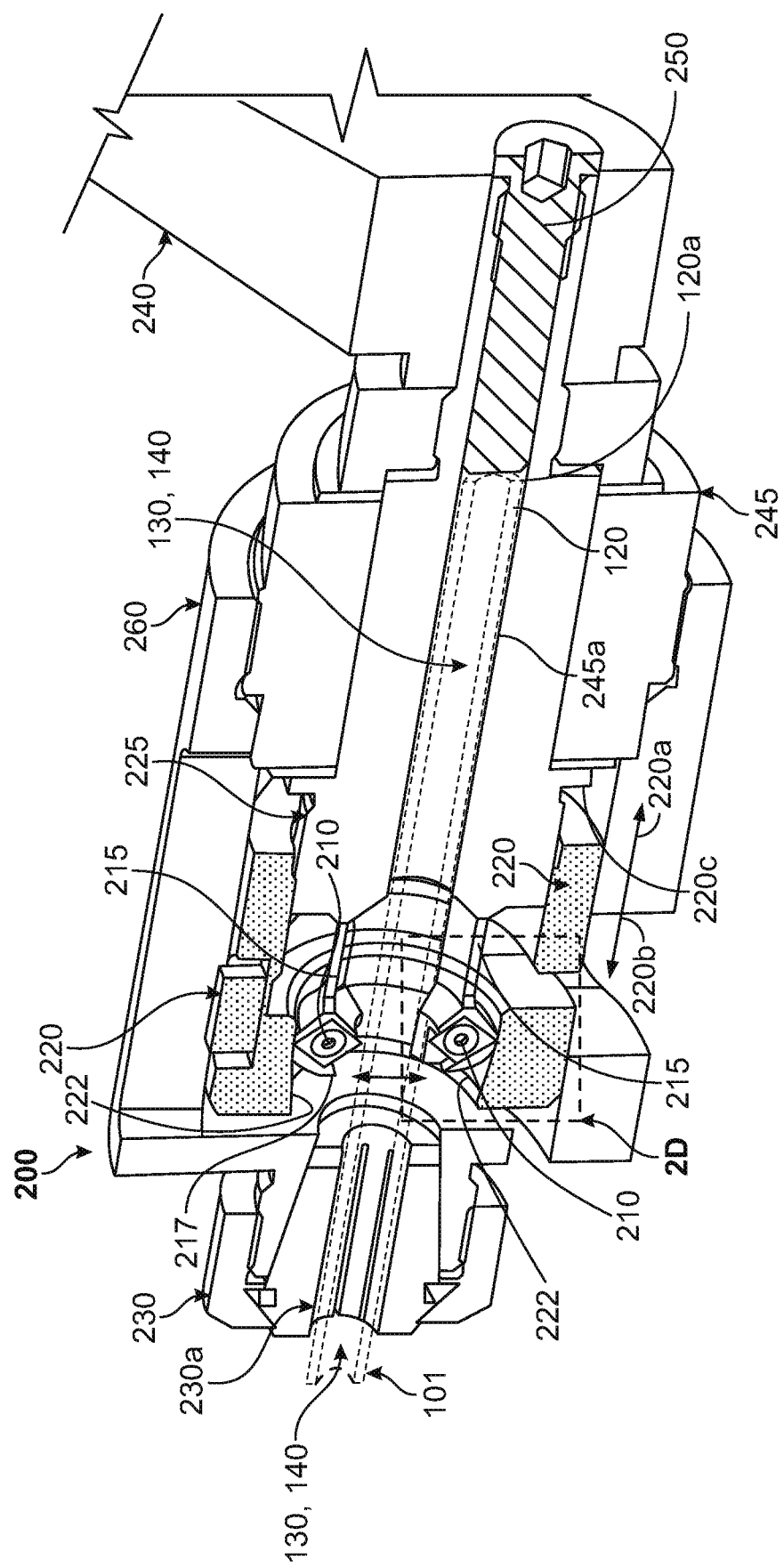
FIG. 2C is a cross-sectional view of the conduit housing cutter of FIG. 2A taken along lines 2C-2C of FIG. 2A, according to an embodiment of the disclosure.
Figure 2D:
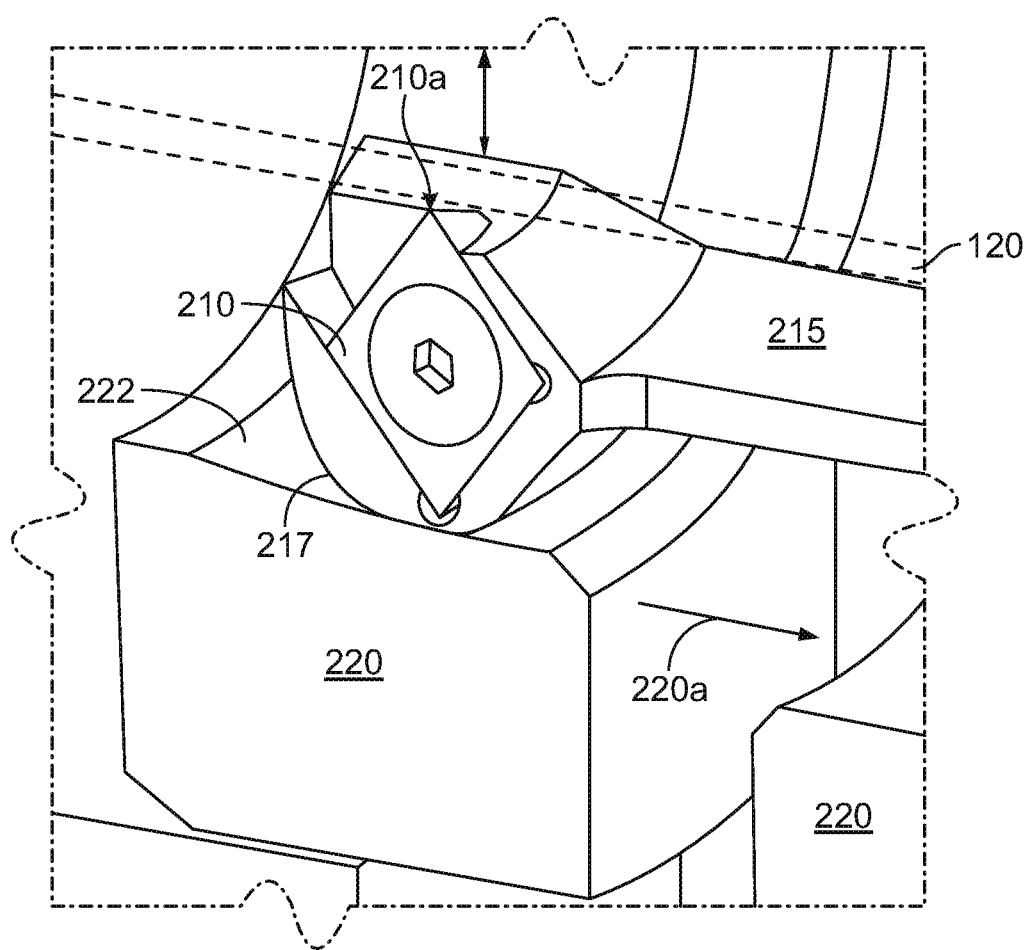
FIG. 2D is an enlarged view of section 2D of FIG. 2C.

Referring generally to FIG. 1, this illustration shows a cross-section of a tubing encapsulated power cable (TEPC) 100, such as the one produced by AccessESP® for example. TEPC cable 100 is part of a system configured to deliver power to subsurface ESP (Electric Submersible Pump) systems (not shown). As stated previously, a large percentage of the failures of existing ESP systems are associated with the motor lead extension (MLE) cable that provides power to the motors that run the pumps from the surface. More specifically, the failures occur as a result of improper termination of a cable end, or of the cable end being inadequately prepared.

This exemplary embodiment of TEPC cable 100 comprises a perfluoroalkoxy (PFA) outer insulator 110 surrounding and insulating three electrical conduits 101, 102, and 103. The electrical conduits 101, 102, and 103 may further comprise conduit housing 120 (e.g., metal) surrounding a conduit insulator 130, and ultimately a conductor 140. The conduit insulator 130 functions to separate the conductor 140 (e.g., copper, tin copper, among others) from the conductive armor layer 120.

The conduit housing 120 may be selected with regards to corrosion resistance as well as life. In a traditional MLE conduit (not shown) lead may be used as the conduit housing.

Electrical performance challenges can however arise from having extremely high voltages running through the conductor 140 provided within a conduit housing 120. This is especially true where the TEPC cable 100 terminates into another component such as a connector housing (not shown). Computer models simulating these high voltages running through the TEPC cable 100 have revealed that the preparation of the ends of the conduit housing 120 where the TEPC cable 100 terminates may reduce the electrical stresses otherwise generated in these areas.

The performance of TEPC cable 100 can be greatly compromised by the techniques used to cut the cable and prep the ends for termination in different downhole components. Traditional tubing cutters deform the conduit housings 120 and press the conduit housings 120 into the conduit insulator 130 underneath. Unfortunately, this deformation can reduce the electrical insulation capability of the conduit insulator 130.

Another issue is the generation of an electrical stress riser at the face of the conduit housing 120 where the conduit housing 120 is cut. Sharp cross-sectional edges may lead to areas where electrical charge can accumulate in high voltage applications such as are possible for the TEPC cable 100. Traditional tubing cutters may leave a burr when they cut the conduit housing 120 leading to one of these stress risers. Over time these areas may often lead to electrical failure due to the insulative properties of the conduit insulator 130 being overly stressed by the accumulation of charge on the electrical stress riser.

All of these exemplary issues may be addressed in a controlled, machining environment. However, these exemplary issues become much more difficult to address when the TEPC cable 100 is being prepped on the rig floor or in other field activities where controlled facilities are not available. The tools needed must have a small profile and be operable by hand in confined spaces. Additionally, if the tools do not need outside power, there is a further reduction in the quantities of necessary or required equipment.

An embodiment of this disclosure uses a method involving a system of hand tools to cut the conduit housing 120 of the TEPC cable 100 without damaging the conduit insulator 130, remove the cut off conduit housing 120, and prepare the end of the conduit housing 120 that remains to minimize electrical stress concentrations as much as possible. This system cuts the conduit housing 120 as opposed to deforming the conduit housing 120 to minimize the effects of the prepping process on the electrical properties of the TEPC cable 100.

Embodiments of this disclosure include the use of a conduit housing cutter 200, see FIGS. 2A, 2B, 2C and 2D. Referring generally to these figures, the conduit housing cutter 200 comprises two cutters 210 (in this illustrative example, such as carbide blades, among others). Although two cutters 210 are shown, depending upon the size constraints of the conduit housing cutter 200, more than two cutters 210 may be used.

The cutters 210 are oriented with cutter points 201a facing inward towards axis 242 and oriented about the axis 242 in spaced apart relationship so that each cutter will cut into the same circumferential cut line on the outside of an inserted housing 120. The cutters are coupled to deformable cutting supports 215. These cutting supports 215 are elastically deformable in a radial direction about the axis 242. In this embodiment, a single cutter 210 is attached to each cutting support 215. However, more than one cutter 210 may be used on each cutting support 215. There should be at least an equal number of cutting supports 215 as there are cutters 210.

The cutting supports 215 are deflected radially inward at their tips by a keyed colleting nut 220. When an operator turns the handle 240 in a first direction, a hollow shaft 245 is likewise rotated in that first direction. The shaft contains an internal annular section 244a disposed about and along the axis 242 for receiving the tubular conduit 120. When the handle is rotated in the first direction, the keyed colleting nut 220 is motivated axially along axis 242 towards the handle 240 in cutting direction 220a (or in the opposite direction 220b when the handle 240 is rotated in a second, opposite direction). The keyed colleting nut 220 is moved axially by threadably engaging a threaded portion 225 of the hollow shaft 245. The cutting supports are coupled to an end of the hollow shaft 245 opposite to the handle 240.

The hollow shaft 245 rotates within a non-rotating housing 260. The keyed colleting nut 220 is non-rotatably but axially slidably engaged to the housing 260 (shown here engaged on, e.g., an internal surface of the housing). The engagement between the keyed colleting nut 220 and the housing 260 allows the threaded portion 225 of the hollow shaft 245 to axially translate the keyed colleting nut 220 in the cutting direction 220a when the handle 240 is rotated in a first direction, and in the opposite direction when the handle is rotated in the opposite direction.

The inner surface 222 of the keyed colleting nut 220 is conically configured. The angle of the cone and the rate of rotation of the handle 240 determines the rate at which the cutters 210 radially cut into a conduit housing 120. An outer surface 217 of the cutting supports 215 slidably engages the inner surface 222 of the keyed colleting nut 220 and provides a radial force for the cutters 210 to apply to the conduit housing 120. As the keyed colleting nut 220 is moved in the first direction 220a, the outer surface 217 of the cutting supports is urged radially inwardly along the keyed colleting nut inner conical surface 222, which in turn moves the cutting tip 210a into engagement with the surface of the tubing housing 120. Mechanical stops 220c provide the maximum length of travel in the cutting direction 220a.

In some embodiments, a conduit housing cutter 200 may further include a conduit housing support 230, attached to an end of the housing 260 and capable of receiving the conduit housing therethrough. The conduit housing support 230 further comprises an annular channel 230a disposed along and about the axis 242 for receiving the conduit housing 120.

The conduit housing cutter 200 may also include various sizes of plugs 250 (FIGS. 2C, 2D) to control the length of conduit housing 120 that is cut, or the plug 250 may be removed and the length of cut conduit housing determined dynamically.

An exposed end 120a of one of the conduits 101, 102, or 103 to be stripped is inserted into the conduit housing cutter 200 end opposite the handle along axis 242. The use of blades for cutters 210 prevents the conduit housing 120 from being pressed inwards toward the conduit insulator 130 as the conduit housing 120 is cut. Use of a traditional tubing cutting wheel in place of the blades applies a radial force to the conduit housing 120 and would cause the conduit housing 120 to be deformed inward, towards the conductor 140. The use of blades for the cutters 210 also prevents the conduit housing 120 from being egged or deformed in any other way because the force normal to the surface of the conduit housing 120 is minimal.

The conduit housing 120 is cut by rotating a handle 240 which rotates the hollow shaft 245 on which both of the cutters 210 are mounted via the cutting supports 215. As the hollow shaft 245 rotates about axis 242 in a first cutting direction, the keyed colleting nut 220 is pulled in a cutting direction 220a towards the handle 240 by the threaded portion 225 of the hollow shaft 245, which in turn urges the ends of the cutting supports 215 and the cutters 210 radially inward towards the conduit housing 120. Once the tubing 120 is cut to the desired depth (creating a circumferential groove in the outer surface of housing conduit 120), the handle is rotated the opposite direction and the keyed colleting nut 220 moves in an opposition direction 220 and returns to its starting position, which in turn permits the cutting supports 215 to move radially outward to likewise return the cutters 210 to their original non-cutting positions. The tubing 120 can then be removed from the cutting tool 200.

The feed rate and cut depth are both controlled by the keyed colleting nut 220 through the inner surface 222 of the keyed colleting nut 220 and the fineness of the threaded portion 225 and rotational speed of the hollow shaft 245. These factors allow the cut to be smooth and repeatable every time. Also, the conduit housing cutter 200 assembly can be scaled to accommodate various conduit housing sizes and cut depth.

The conduit housing cutter 200 should not be used to actually break all the way through the conduit housing 120, but instead should cut to a depth that leaves a thin metal web (groove) that may be easily broken when the cut piece of conduit housing 120 is pulled off the end of the TEPC cable 100. Cutting all the way through the conduit housing 120 with the cutters 210 may often leave a burr. When the conduit housing 120 is not cut all the way through, the burr is avoided. In this fashion, the cutting tool cuts a circumferential groove in the outer surface of housing conduit 120 that extends nearly through the entire depth of the tubing thickness of the housing conduit.

Figure 3A:
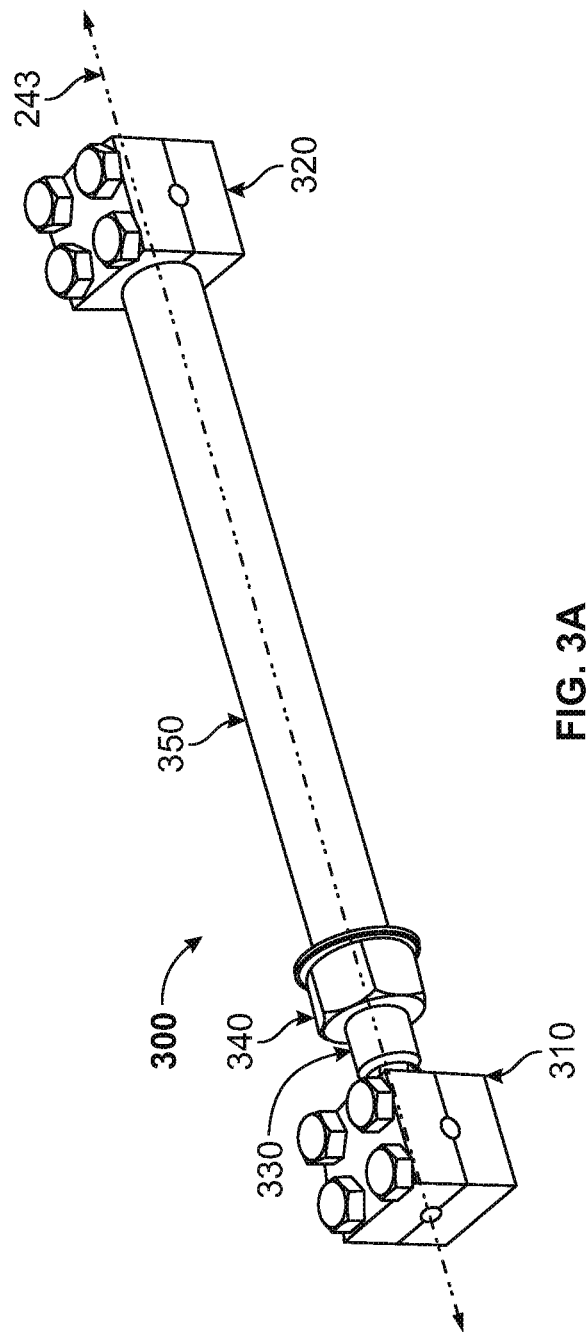
FIG. 3A is a perspective outer view of a conduit housing spreader, according to an embodiment of the disclosure.
Figure 3B:
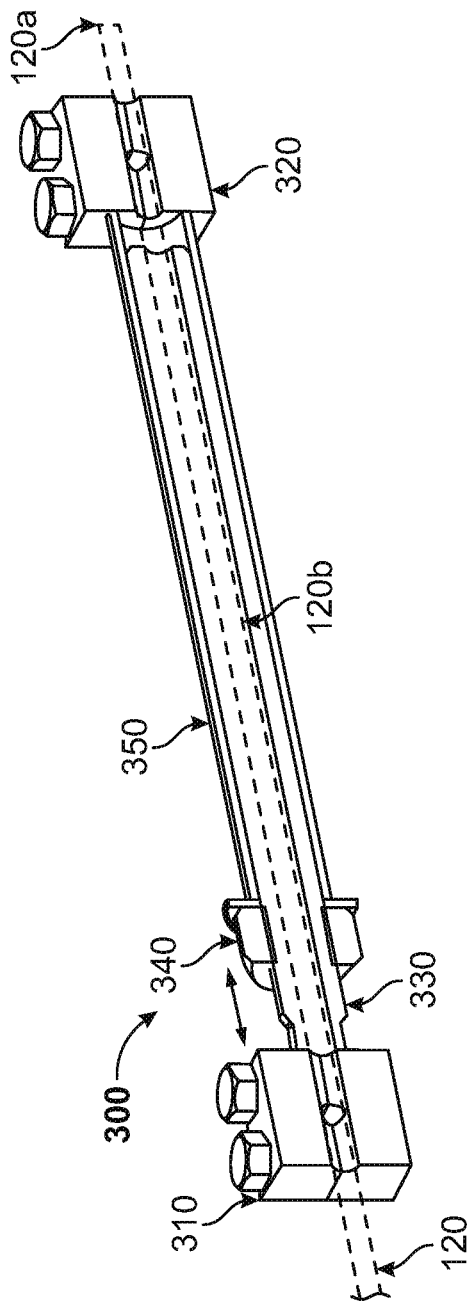
FIG. 3B is a longitudinal cross-sectional view of the conduit housing spreader of FIG. 3A, according to an embodiment of the disclosure.
Figure 3C:
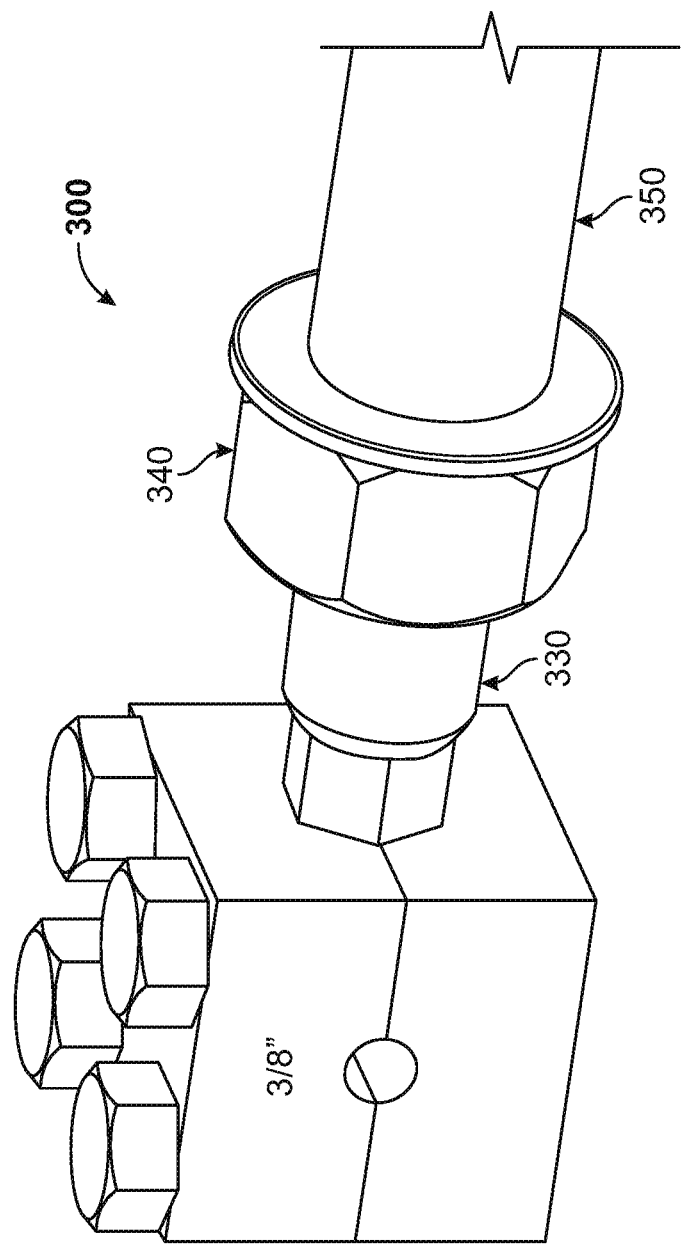
FIG. 3C is an enlarged perspective outer view of one end of the conduit housing spreader of FIG. 3A, according to an embodiment of the disclosure.

After the conduit housing 120 has been cut down to the desired depth, and the conduit housing 120 is removed from the cutting tool 200, the end portion of the conduit housing 120 (between the point of the cutting and the end 120a) must be removed from the end of the TEPC cable 100 to complete the stripping. Turning now to FIGS. 3A, 3B and 3C, these figures illustrate an embodiment of a conduit housing spreader 300 that may be used to facilitate removal of the conduit housing 120 from the end of the TEPC cable 100.

The conduit housing spreader 300 may comprise a first clamp 310 and a second clamp 320. The first clamp 310 may be proximate to a hollow screw thread 330. The first clamp 310 may be coupled to the hollow screw thread 330. Surrounding the hollow screw thread 330 and proximate to the second clamp 320 is a tube 350. The second clamp 320 may be coupled to the tube 350. The clamps, screw thread, and tube 350 are aligned along axis 243.

A driving nut 340 may be threadably engaged with the hollow screw thread 330. When an operator rotates the driving nut 340, the tube 350 is translated axially along the outer surface of the hollow screw thread 330 along axis 243. Proper rotation of the driving nut 340 will move second clamp 320 axially away from the first clamp 310. The result is that a tensile load is applied to the uncut portion of conduit housing remaining in the cut (groove) (an example location of such groove being depicted by arrow 120b). This uncut portion (groove 120b) eventually fails in tensile fracture as the driving nut is rotated.

An exposed end of a cut conduit 101, 102, 103 having cut groove 120b is inserted into the conduit housing spreader 300. The conduit housing 120 is clamped on one side of the cut 120b by first clamp 310 and clamped on another side of the cut 120b by second clamp 320. The first and second clamps 310, 320 may be split blocks for example.

The driving nut 340 is then rotated on the hollow screw thread 330, translating the tube 350 axially along the surface of the hollow screw thread 330. Rotating the driving nut 340 causes the first clamp 310 and the second clamp 320 to axially move apart from one another.

The chance of an inward facing burr is minimized because the conduit housing 120 is pulled apart along the axis. The conduit housing 120 is also held straight while sliding off the conduit insulator 130 so that the conduit housing 120 does not shave off any of the insulation during the conduit housing's 120 removal.

The first and second clamps 310, 320 that clamp onto the conduit housing 120, may be specifically sized so that the first and second clamps 310, 320 do not crush/deform the conduit housing 120. The conduit housing spreader 300 may also be scaled to fit any size and length combination of conduit housing as appropriate. In operation, the conduit housing spreader may be operated by hand and should only need a single operator to utilize.

Figure 4C:
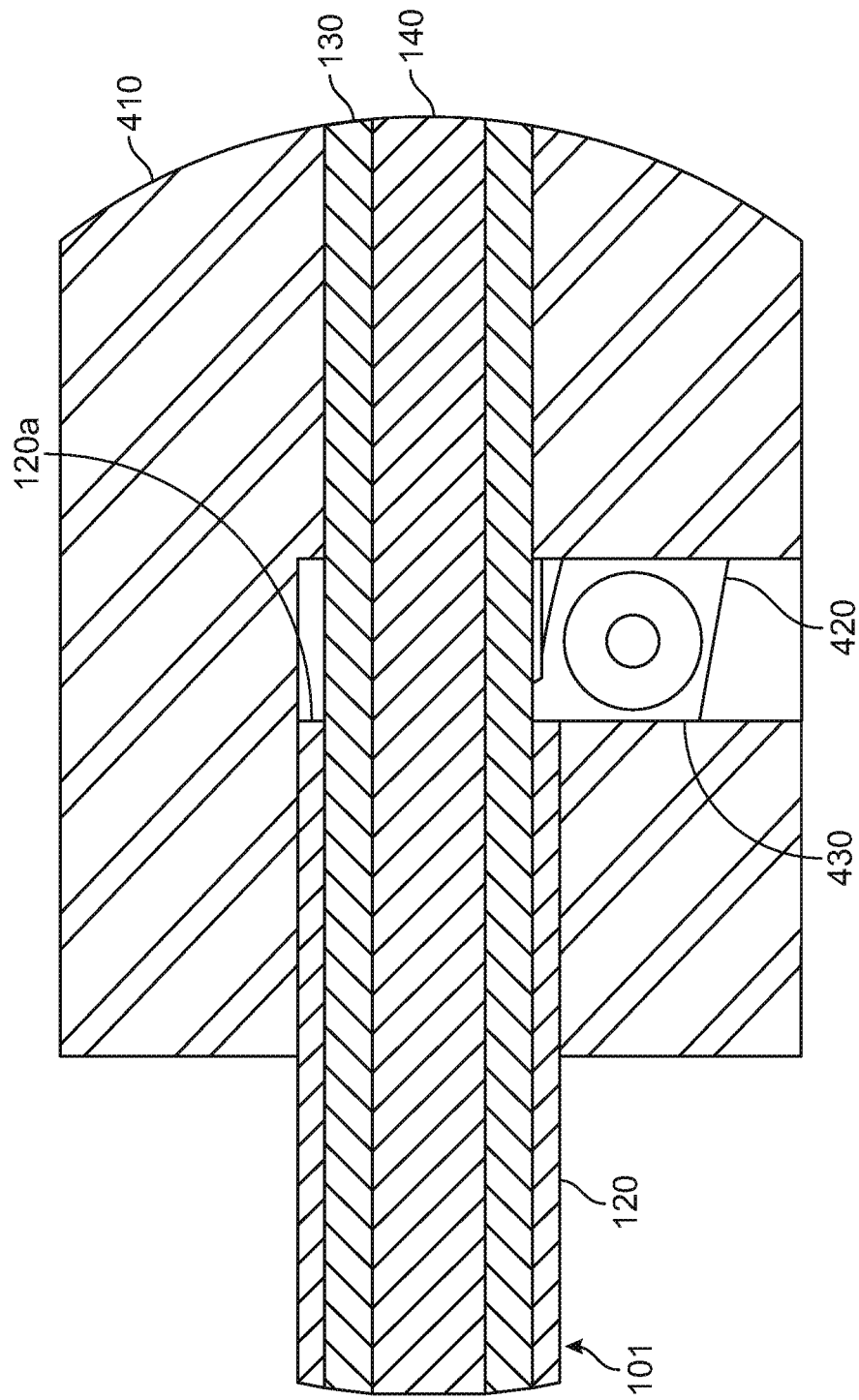
FIG. 4C is an enlarged view taken from area 4C of FIG. 4B.

Following the removal of the cut conduit housing 120 from the end of the TEPC cable 100, the remaining conduit housing 120 at the site of the cut may need to be squared in order to remove any burrs or metal shards. Turning now to FIGS. 4A, 4B and 4C, these figures generally show the rotating components of a squaring tool 400. These drawings illustrate the rotating components that may be housed in a structure similar to the housing conduit cutter 200.

An exposed housing conduit 120 end would be inserted into the hollow space of a rotating shaft 410 within the squaring tool 400. The end 120a of the conduit housing 120 would come into contact with a cutting blade 420 provided in an adjustable holder 430. As the rotating shaft 410 is rotated around the conduit housing 120, the cutting blade 420 deburrs and makes the end 120a of the conduit housing 120 square, inhibiting the deformation or electrical charge concentration that would otherwise occur with an angled or deformed conduit housing end 120*a*.

The removal of the conduit housing 120 from the previously two processes may leave a chamfer on the remaining conduit housing 120 face that comes down to a point on the surface of the conduit insulator 130. This point may result in an electrical stress riser. Over time, an electrical stress riser may lead to failure at this location.

To reduce the occurrence of an electrical stress riser, the squaring tool 400 cuts the face 120*a* of the conduit housing 120 at an approximately right angle. The squaring tool 400 is slid on over the end of the cut conduit 101, 102, 103 and a cutting blade 420 (such as a carbide cutter) squares the end surface of the conduit housing 120.

The speed of the cutting blade 420 is controlled via the rotation of the components shown (such as with a rotating handle (not shown)). The feed of the cutting blade 420 may be adjusted radially inward. The operation of the squaring tool 400 can be done by a single operator in the field. After the squaring tool 400 removes the burrs from the end surface of the conduit housing 120, the conduit 101, 102, 103 is removed and ready to be incorporated into its intended assembly.

Another embodiment of the current disclosure is a method of preparing a TEPC cable 100 for incorporation or termination into another component. The method may involve exposing conduits 101, 102, and 103 from within an outer insulator 110. In some cases, the conduits 101, 102, and 103 may already be exposed.

Turning generally now to FIGS. 5A-5D, these figures illustrate an embodiment of a representative method 500 for preparing a TEPC cable 100 for termination. The method 500 may include cutting a conduit housing 510 and sliding a cut conduit housing off a conduit 520. The embodiment of the method 500 may further include squaring the end surface of the cut conduit housing 120 if necessary 530.

Figure 5A:
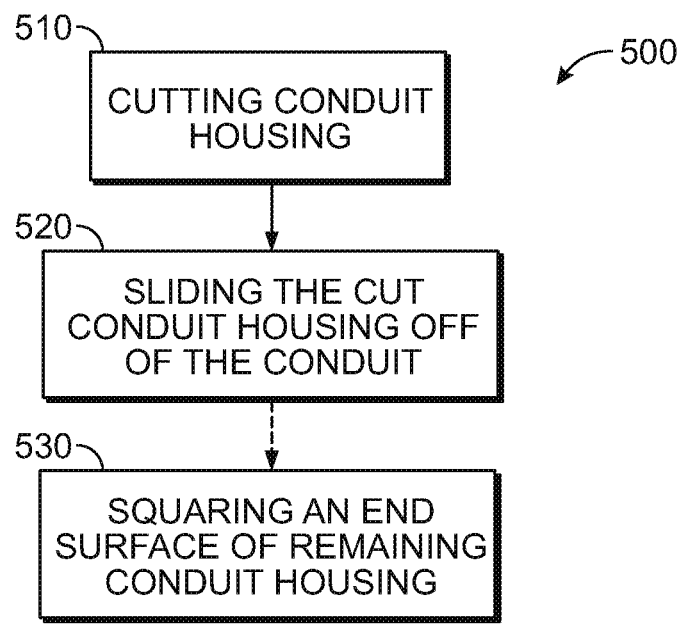
FIG. 5A is an illustrative flowchart showing a representative method for preparing a TEPC cable for termination, according to an embodiment of the disclosure.
Figure 5B:
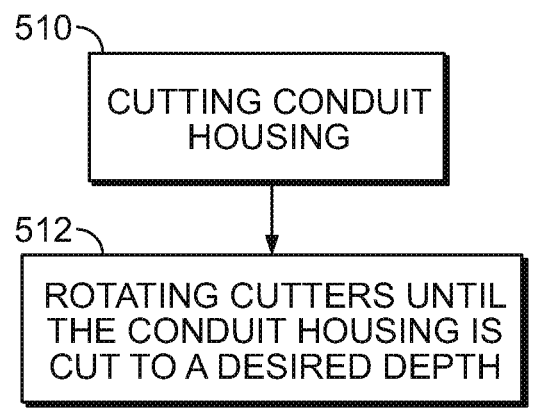
FIG. 5B is an illustrative flowchart showing additional details for the action of cutting a conduit housing, according to an embodiment of the disclosure.

As shown in FIG. 5B, cutting a conduit housing 510 may further include rotating cutters until the conduit housing is cut to a desired depth 512. After inserting a conduit into the conduit housing cutter, the cutters may be rotated by turning a handle coupled to the cutters via the shaft. After the desired depth is reached, the handle is turned in a reverse direction to allow the keyed colleting nut 220 to move away from the handle 240, resulting in the cutting supports 215 elastically returning to their previous positions and the cutters 210 moving radially outward. As the cutters 210 are moved radially outward, the cutters 210 are released from the cut surface of the conduit housing 120.

Figure 5C:
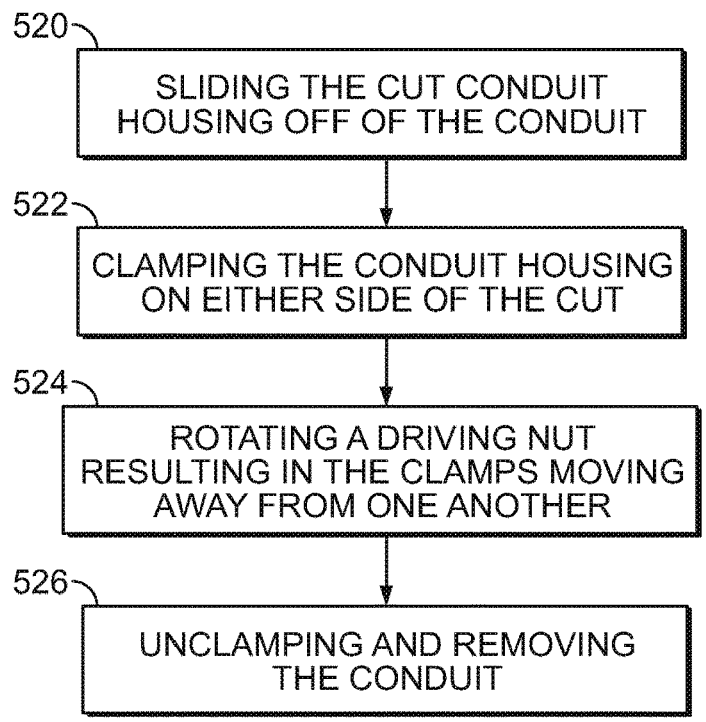
FIG. 5C is an illustrative flowchart showing additional details for the action of sliding the cut conduit housing off of the conduit, according to an embodiment of the disclosure.

In FIG. 5C, sliding the cut conduit housing off the conduit 520 may further comprise clamping the conduit housing on either side of the cut 522, rotating a driving nut, resulting in the clamps moving away from one another and the removal of the cut portion of conduit housing 524, and unclamping and removing the conduit 526. Depending upon the conduit, the driving nut rotation resulting in the clamps moving away from one another may be continue until the cut portion of conduit housing is completely removed from the rest of the conduit, or may be discontinued prior to complete removal of the cut portion of the conduit. In some cases, the two clamps may be pulled by hand for the final stages of removal of the cut portion of the conduit housing.

Figure 5D:
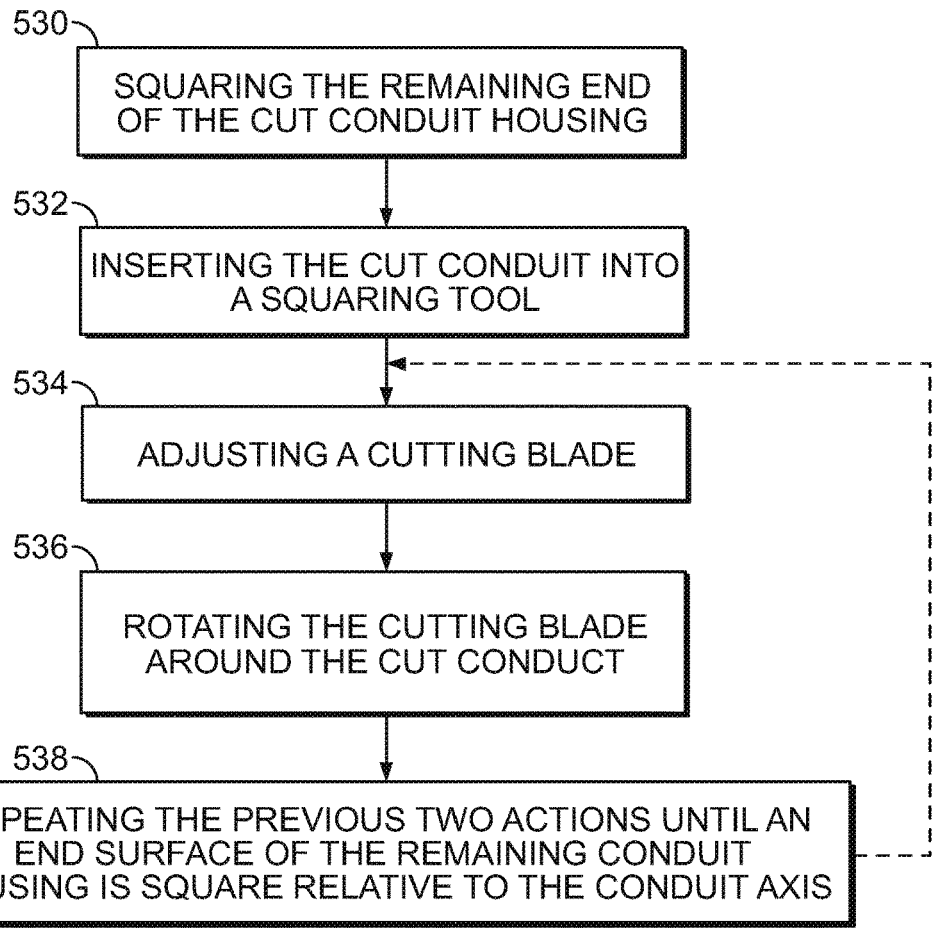
FIG. 5D is an illustrative flowchart showing additional details for the action of squaring the remaining end of the cut conduit housing, according to an embodiment of the disclosure.

Turning now to FIG. 5D, squaring the remaining end of the cut conduit housing 530 may further comprise inserting the cut conduit into a squaring tool 532, adjusting a cutting blade 534, rotating the cutting blade around the cut conduit 536, and repeating the previous two actions until an end surface of the remaining conduit housing is square 538 with respect to the axis of the conduit.

After application of method 500, a conduit should be in a proper condition for termination.

Figure 6A:
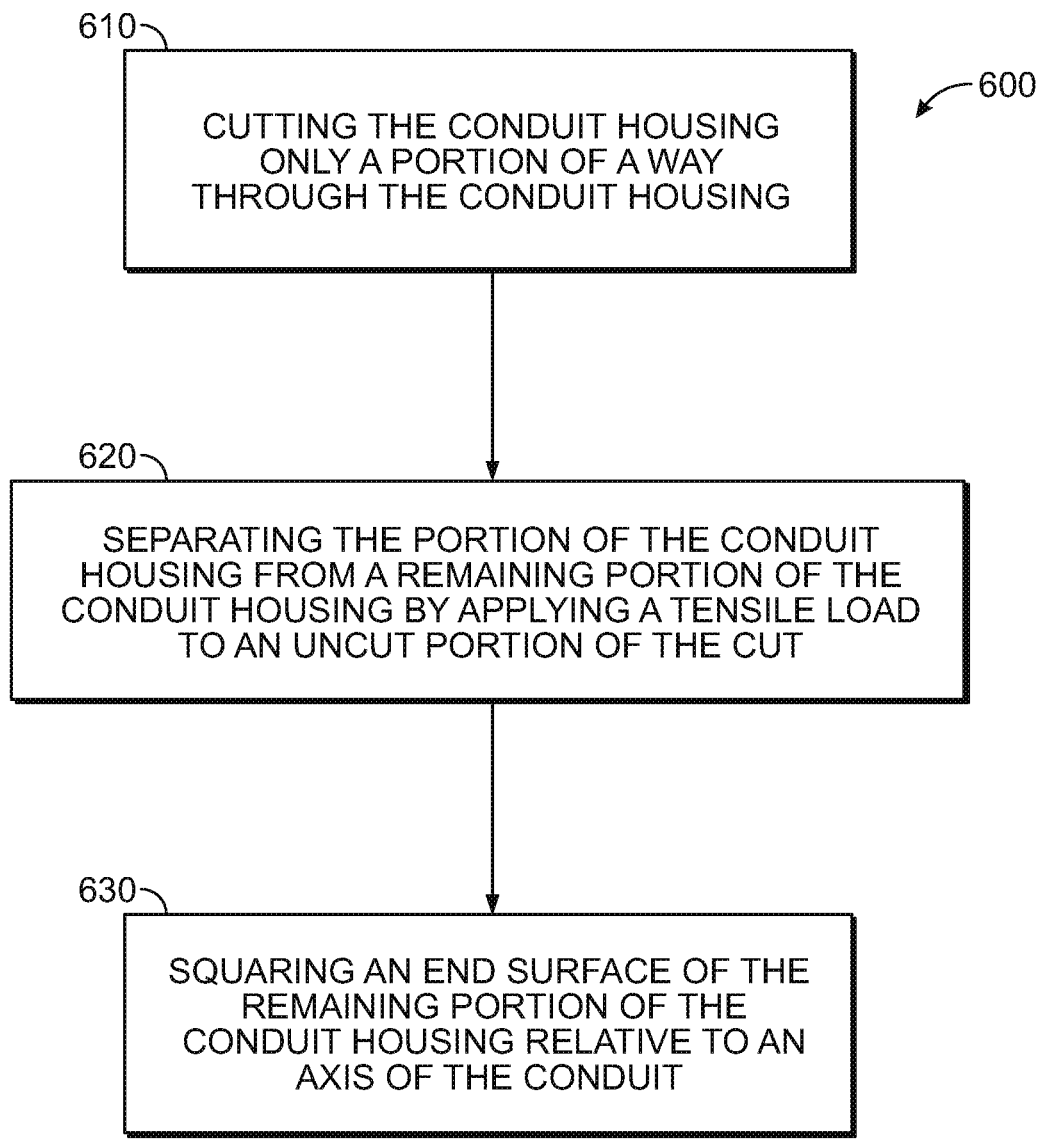
FIG. 6A is an illustrative flowchart showing a representative method for removing a portion of a conduit housing from a conduit, according to an embodiment of the disclosure.
Figure 6B:
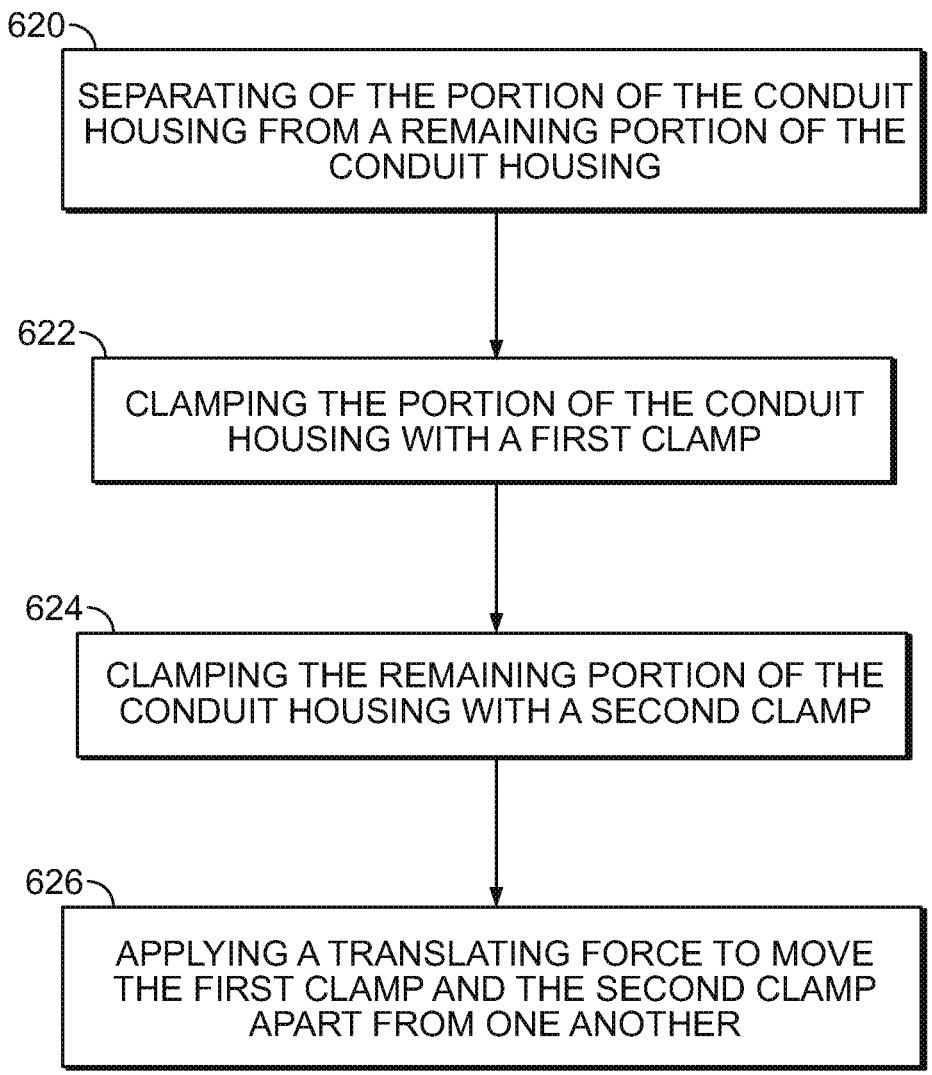
FIG. 6B is an illustrative flowchart showing additional details for the action of separating of the portion of the conduit housing from the remaining portion of the conduit housing, according to an embodiment of the disclosure.
Figure 6C:
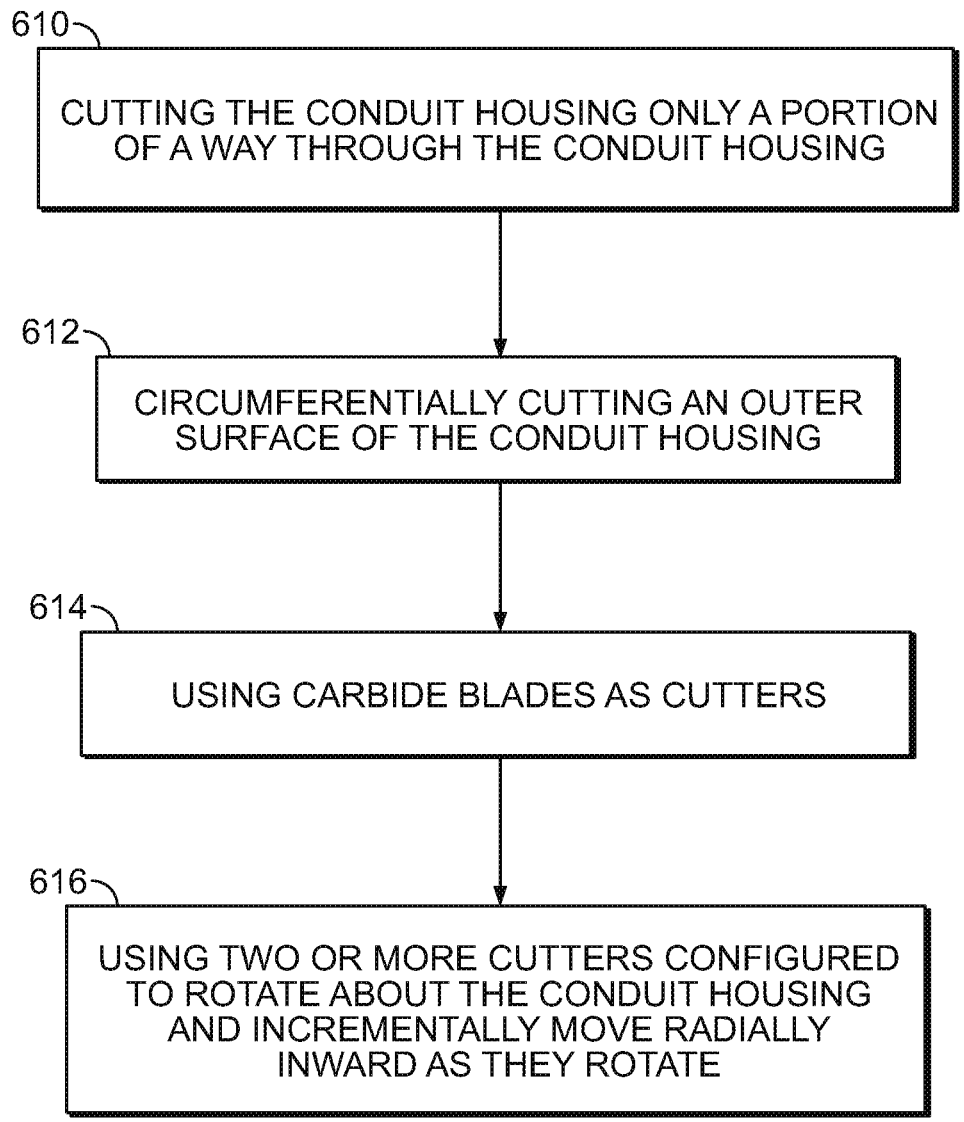
FIG. 6C is an illustrative flowchart showing additional details for the action of cutting the conduit housing only a portion of a way through the conduit housing, according to an embodiment of the disclosure.

Another embodiment of a method is illustrated in the exemplary flowchart shown in FIGS. 6A-6C. FIG. 6A shows a representative method for removing a portion of a conduit housing from a conduit 600 comprising cutting the conduit housing only a portion of a way through the conduit housing 610, separating the portion of the conduit housing from a remaining portion of the conduit housing by applying a tensile load to an uncut portion of the cut 620, and squaring an end surface of the remaining portion of the conduit housing relative to an axis of the conduit 630.

The portion of the conduit housing is separated from the remaining portion of the conduit housing via a tensile fracturing of the uncut portion of the cut. Turning generally to FIG. 6B, the separating of the portion of the conduit housing from the remaining portion of the conduit housing 620 further comprises clamping the portion of the conduit housing with a first clamp 622, clamping the remaining portion of the conduit housing with a second clamp 624, and applying a translating force to move the first clamp and the second clamp apart from one another 626. In some cases, the translating force may be applied using a conduit housing separator and the rotation of the driving nut.

Referring to FIG. 6C, cutting of the conduit 610 may further comprise circumferentially cutting an outer surface of the conduit housing 612, using carbide blades as cutters 614. In addition, cutting may also comprise using two or more cutters configured to rotate about the conduit housing and incrementally move radially inward as they rotate 616.

Although only a few example embodiments have been described in detail above, those skilled in the art will readily appreciate that many modifications are possible in the example embodiments without materially departing from this disclosure. Accordingly, all such modifications are intended to be included within the scope of this disclosure as defined in the following claims.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method for preparing an electric submersible pump power cable conduit for termination comprising:
   cutting a conduit housing of the conduit;
   sliding the cut conduit housing off the conduit; and
   squaring an end surface of remaining conduit housing;
   wherein the above steps are performed with hand powered tools.

2. The method of claim 1 wherein the cutting of the conduit housing further comprises rotating cutters on a hand powered conduit cutting tool about an outer surface of the conduit until the conduit housing is cut to a desired depth.

3. The method of claim 1 wherein the sliding of the cut conduit housing off of the conduit further comprises:

clamping the conduit housing on either side of the cut using clamps;
rotating a driving nut to spread the clamps apart from one another; and
unclamping the clamps and removing the conduit.

4. The method of claim 3 wherein the spreading of the conduit housing comprises using a conduit housing spreader tool.

5. The method of claim 1 wherein the squaring the end surface of the cut conduit housing further comprises:
inserting the cut conduit into a hand powered squaring tool;
adjusting a cutting blade against an end surface of the cut conduit;
rotating the cutting blade about the cut conduit; and
repeating the previous two steps as needed until the end surface of the cut conduit is square relative to an axis of the cut conduit.

6. The method of claim 2 wherein the hand powered tool for cutting the conduit housing further comprises:
a handle rotatably coupled to the cutters; and
a keyed collet nut configured to move the cutters radially with regards to an axis of the conduit when the handle is rotated.

7. The method of claim 1 wherein the hand powered tool for cutting the conduit housing further comprises;
a plug attached to the conduit housing cutter tool and configured to properly locate the cut made by the cutters when the conduit is inserted into the conduit housing cutter and abuts the plug.

8. The method of claim 1 wherein the hand powered tool for cutting the conduit housing further comprises:
a hollow shaft rotatably coupled to a handle and the cutters and comprising:
a threaded portion configured to axially translate a keyed collet nut when the handle is rotated; and
wherein axial translation of the keyed collet nut results in radial movement of the cutters on cutter supports.

9. The method of claim 1 wherein the squaring of the remaining conduit housing further comprises rotating a hand powered squaring tool.

10. The method of claim 5 wherein the cutting blade is a carbide blade.

11. A system for removing a portion of conduit housing from an electric submersible pump power cable conduit comprising:
a hand powered conduit housing cutter for cutting partially through the conduit housing of the conduit;
a hand powered conduit housing spreader for pulling the portion of the conduit housing apart from a remaining conduit housing; and
a hand powered squaring tool to square an end surface of the remaining conduit housing relative to an axis of the conduit.

12. The system of claim 11 wherein the conduit housing cutter further comprises two cutters that cut the conduit housing and are radially moved and rotated during rotation of a handle.

13. The system of claim 12 wherein the cutters comprise carbide blades.

14. The system of claim 11 wherein the conduit housing spreader further comprises two clamps for clamping to both sides of the cut conduit housing.

15. The system of claim 11 wherein the conduit housing spreader further comprises a driving nut that pulls the portion of the conduit housing from the remaining conduit housing when rotated.

16. A method for removing a portion of an electric submersible pump power cable conduit housing from a conduit with hand powered tools, comprising:
cutting the conduit housing only a portion of a way through the conduit housing;
separating the portion of the conduit housing from a remaining portion of the conduit housing by applying a tensile load to an uncut portion of the cut; and
squaring an end surface of the remaining portion of the conduit housing relative in an axis of the conduit.

17. The method of claim 16, wherein the separating of the portion of the conduit housing from a remaining portion of the conduit housing further comprises:
clamping the portion of the conduit housing with a first clamp and clamping the remaining portion of the conduit housing with a second clamp; and
applying a translating, force to move the first clamp and the second clamp apart from one another.

18. The method of claim 16 wherein the cutting of the conduit housing comprises:
circumferentially cutting an outer surface of the conduit housing.

19. The method of claim 16 wherein the cutting of the conduit housing comprises:
using carbide blades as cutters.

20. The method of claim 16 wherein the cutting of the conduit housing comprises:
using two or more cutters configured to rotate about the conduit housing and incrementally move radially inward as they rotate.

\* \* \* \* \*